US010542762B2

(12) United States Patent
Haji Begli et al.

(10) Patent No.: US 10,542,762 B2
(45) Date of Patent: Jan. 28, 2020

(54) CURING AIDS

(75) Inventors: Alireza Haji Begli, Ramsen (DE); Waldemar Tschilingiri, Worms (DE); Sonja Willius, Eich (DE)

(73) Assignee: SUDZUCKER AKTIENGESELLSCHAFT MANNHEIM/OCHSENFURT, Mannheim (DE)

(*) Notice: Subject to any disclaimer, the term of this patent is extended or adjusted under 35 U.S.C. 154(b) by 1113 days.

(21) Appl. No.: 13/518,173

(22) PCT Filed: Dec. 3, 2010

(86) PCT No.: PCT/EP2010/007341
§ 371 (c)(1),
(2), (4) Date: Jun. 21, 2012

(87) PCT Pub. No.: WO2011/076333
PCT Pub. Date: Jun. 30, 2011

(65) Prior Publication Data
US 2012/0276257 A1    Nov. 1, 2012

(30) Foreign Application Priority Data
Dec. 23, 2009  (DE) .......................... 10 2009 060 934

(51) Int. Cl.
*A23B 4/027* (2006.01)
*A23L 5/00* (2016.01)
*A23L 29/30* (2016.01)

(52) U.S. Cl.
CPC ............... *A23B 4/027* (2013.01); *A23L 5/00* (2016.08); *A23L 29/30* (2016.08)

(58) Field of Classification Search
CPC .. A23L 1/31463; A23L 1/31445; A23L 1/314; A23L 1/31; A23L 1/09; A23L 1/0315; A23L 1/031; A23L 1/03; A23L 1/00; A23L 1/0305; A23L 1/218; A23L 1/31409; A23L 1/317; A23L 1/3175; A23L 1/318; A23B 4/00; A23B 4/023; A23B 4/02; A23B 4/0235; A23B 4/027; A23B 4/20; A23V 2002/08; A23V 2250/636; A23V 2250/62; A23V 2200/02; A23V 2200/04; A23V 2200/044; A23V 2200/10; A23V 2250/15; A23V 2250/60; A23V 2002/00; A23V 2200/08

USPC ....... 426/262, 265, 266, 331, 541, 545, 546, 426/652, 264, 624, 661, 561, 542, 544
See application file for complete search history.

(56) References Cited

U.S. PATENT DOCUMENTS

| 2,739,899 A | * | 3/1956 | Hollenbeck ................... 426/265 |
| 3,122,442 A |   | 2/1964 | Sair |
| 3,595,682 A |   | 7/1971 | Lind et al. |
| 4,156,027 A |   | 5/1979 | Deppner, Jr. |
| 5,350,586 A | * | 9/1994 | Eckholm et al. ............. 426/105 |
| 2009/0214752 A1 | * | 8/2009 | Nielsen ................... A23B 4/12 426/643 |
| 2009/0232939 A1 |   | 9/2009 | Berge et al. |
| 2010/0174001 A1 |   | 7/2010 | Kowalczyk et al. |
| 2010/0267658 A1 | * | 10/2010 | Wach et al. ..................... 514/53 |
| 2011/0097470 A1 | * | 4/2011 | Kowalczyk et al. ......... 426/541 |

FOREIGN PATENT DOCUMENTS

| AU | 2009 100 200 A4 | 4/2009 |
| DE | 101 11 941 A1 | 9/2002 |
| DE | 10 2004 002380 A1 | 7/2004 |
| EP | 0 631 732 A1 | 1/1995 |

OTHER PUBLICATIONS

Proper Processing of Wild Game and Fish. C. Cutter, Penn State College of Agricultural Sciences. Downloaded from the Internet at http://pubs.cas.psu.edu/FreePubs/pdfs/uh72.pdf.*
Miteva et al: "Effects of Some Technologies of Curing Uncomminuted Meat Products of Their Flavor Part 1. Changes in the Contents of Fatty Acids as Meat Flavor Precursors," Die Nahrung, vol. 33, No. 4, 1989, pp. 333-337, XP002626037, ISSN: 0027-769X, DOI: 10.1002/food.19890330410 p. 334, lines 10-14, p. 336, lines 7-11.
International Search Report (in German with English translation) for PCT/EP2010/007341, dated Mar. 18, 2011; ISA/EP.
International Preliminary Report on Patentability including Annexes. English Translation of International Preliminary Report on Patentability dated Dec. 14, 2011.

* cited by examiner

*Primary Examiner* — Subbalakshmi Prakash
(74) *Attorney, Agent, or Firm* — Stephen T. Olson; Harness, Dickey & Pierce, P.L.C.

(57) ABSTRACT

A kit for curing a food product includes a nitrite curing salt component (NPS) and a sugar substance component. The sugar substance component is a sucrose isomer composition. The sucrose isomer composition consists primarily of the sucrose isomers isomaltulose and trehalulose.

33 Claims, No Drawings

CURING AIDS

CROSS-REFERENCE TO RELATED APPLICATIONS

This application is a 371 U.S. National Stage of International Application No. PCT/EP2010/007341, filed Dec. 3, 2010, which claims priority to German Patent Application No. DE 10 2009 060 934.2, filed Dec. 23, 2009. The entire disclosures of the above applications are incorporated by reference herein.

FIELD

The invention relates to the preparation and stabilization of foods, in particular meat and fish products containing muscle meat by curing using nitrite salts. This invention presents new curing aids, especially improved sugar substances for use in curing these foods. The improved sugar substance according to this invention is a sucrose isomer composition containing isomaltulose and/or trehalulose.

BACKGROUND

In general untreated meat products rapidly become pale and/or spoil due to oxidation of the muscle pigment as a result of contamination with undesirable microorganisms which may be a health hazard and are introduced during the slaughter operation in particular or during further processing of the foodstuff. Curing delays or suppresses these deleterious effects through a number of parallel mechanisms: microorganisms are prevented from proliferating, excess water is withdrawn, which improves the consistency and lowers the $a_W$ value and the curing color and a typical curing aroma are formed.

Nitrite curing salt (NPS) is a composition of nitrite salt (usually $NaNO_2$) and table salt (NaCl) which is known for use in curing foods, for example raw cured products and raw sausage. In the so-called reddening transfer process, nitrite is disproportionated to nitrate and nitrogen monoxide (NO) under acid catalysis. NO then binds to the myoglobin which is present in the muscle fibers of muscle meat of higher vertebrates, to form a red pigment, nitrosomyoglobin which can impart a permanent red pigmentation to foodstuffs.

Another component of the curing process is the enzymatic activity of microorganisms present in the foodstuff or optionally added in a targeted manner, especially staphylococci and lactobacilli. These organisms serve to convert nitrate back into nitrite through a nitrate reductase activity inherent in the organism, and cause a drop in pH (formation of acid) through their metabolic activity, which supports the disproportionation to NO. Disproportionation is further supported by anaerobic glycolysis which proceeds in the muscle meat and is associated with decline in pH (formation of acid). The decline in pH causes coagulation of the protein of the foodstuff, in particular the muscle protein, which thus becomes more easily cuttable.

By heating at the end of the curing process, nitrite reacts with a certain other component of the foodstuff so that additional substances with an antimicrobial action, the so-called Perigo factor, are formed. On the whole a much larger amount of nitrite is necessary for the preservative antimicrobial effect than for the development of curing color and curing aroma.

Nitrite as such is known as a toxic substance which can interfere with the metabolic processes in the human or animal body in a deleterious manner, in particular parts of the respiratory chain. Although foodstuffs cured with nitrite, in particular cured meat products, make only a very minor contribution of approx. 3% to the total nitrite burden in the human body, it is still desirable and necessary from the standpoint of medical physiology, from the standpoint of the "informed" consumer, for the declaration of ingredients on food products and also to fulfill new statutory requirements to reduce the use of nitrite in foodstuffs to be cured and in particular to reduce the residual nitrite content in a cured food product. Thus, the new guideline values for the addition of nitrite salts to cured and dried, meat products that have not been treated with heat include 150 mg/kg (expressed as $NaNO_2$) for the maximum addition of nitrite to the foodstuff to be cured and 50 mg/kg for the maximum residual nitrite level in the cured food product at the time of transfer to the consumer. For the stricter European ecological guidelines, limit values of 80 to 100 mg/kg apply for the maximum addition of nitrite and a maximum allowed residual nitrite content of 50 mg/kg at the time of transfer to the consumer. These values may not be met in some known processes if the shortcomings in the curing result associated with this such as inadequate reddening which is not permanent, taste disadvantages, low stability and microbial contamination.

To improve the desired curing effect of nitrite salts, in particular the microbial stabilization and the red color and also to maintain these even with small quantities of nitrite, so-called curing aids are known to be added during the curing process. A known curing aid is ascorbic acid or ascorbate which is used as a reducing agent having an antioxidant effect and also as an acid-forming component, optionally in combination with sodium tripolyphosphate or synthetic antioxidants such as BHA and BHT. Furthermore, spices or spice extracts which contain naturally occurring antioxidant may also be used. These include, for example, such spices as cloves and rosemary as well as extracts thereof. These curing additives have a recognizably negative effect on taste in certain recipes. Furthermore, the addition of these substances is associated with changes in the sampling sequence in comparison with traditional recipes.

In other approaches an attempt is made to improve the curing results and to bypass statutory restrictions with respect to the addition of nitrate or nitrite salts by adding vegetable concentrates with a high nitrate content to the foodstuff. A low nitrate or nitrite content is then usually only seemingly achieved. Additional curing additives include "sugar substances" which are used to support the curing process and are supposed to improve the curing results. Known sugar substances serve as a nutrient source for the microorganisms (curing flora) which are present in the curing process.

The reddening process to form the permanent meat color in the curing process is known to be time-consuming and the recommended reduced nitrite levels lead to a reddening which unfortunately lasts only a relatively short amount of time. It is therefore desirable to accelerate the reddening process and/or improve the reddening result even with a short process time and a lower nitrite content.

The technical problem on which the invention is based is to provide improved methods and agents for curing foods with which the residual nitrite content in the cured food can be reduced and/or the quality of the curing result, in particular the reddening, especially the intensity and stability of the curing color can be improved.

SUMMARY

The present invention completely solves the technical problem on which it is based by providing a kit for curing foods of several components, where the kit contains or consists of at least the following components: nitrite curing salt component (NPS) and sugar substance component where the kit according to the invention is characterized in particular in that the sugar substance component of the kit is a sucrose isomer composition.

A "kit" for curing foods is understood to be both a kit of separate individual components which are used in conjunction with their purposeful use, i.e., the process of curing, but optionally are also used in separate steps of the process. However, a kit in the present context is also understood to be a one-piece curing salt composition which contains both the nitrite curing salt component of the kit and also at least the sugar substance component according to the invention of the kit in a mixture. In a preferred embodiment the kit according to the invention and/or the nitrite curing salt composition may also contain other components or ingredients.

DETAILED DESCRIPTION

The "sugar substance component" used according to the invention is a curing additive. The sugar substance component according to the invention is provided for use as a curing additive for curing foods, i.e., as a component of the kit according to the invention or as an ingredient of the curing composition according to the invention. In additional embodiments of the invention and variants thereof, additional curing additives may be present in the kit according to the invention or the curing salt composition which is formulated accordingly. These include in particular acid-forming curing additive components and antioxidant curing additive components. In preferred embodiments a curing additive or a sugar substance component is a pure substance, a mixture or a composition. A sugar substance component or another curing additive component preferably is the sugar substance component as well as the acid-forming curing additive component or alternatively and preferably additionally the antioxidant curing additive component or parts thereof.

In preferred variants thereof, the kit and the corresponding curing salt component are free of additional curing additives and are preferably free of additional acid-forming curing and alternatively and preferably additionally free of additional antioxidant curing additives. The kit and the corresponding curing salt composition are preferably free of ascorbic acid and salts thereof, free of glucono-delta-lactone, free of synthetic antioxidants such as BHA and BHT, free of other reducing sugars and sugar derivatives and/or free of other sugar acids and sugar acid derivatives.

The sugar substance component according to the invention is preferably present in an amount of 0.3 to 15 g, preferably from 0.5 to 9 g, especially preferably from 1 to 5 g, based on the dry substance weight of the sugar component and each based on 1 kg of the foodstuff to be cured.

Sugar substances that may be used include those that are known for curing such as fructose, sucrose, maltose, lactose, starch hydrolysates, glucose syrup and glucono-delta-lactone (GdL). According to the invention these sugar substances are now supplemented or preferably partially and especially preferably completely replaced by the sucrose isomer composition according to the invention in known recipes and in new recipes for curing or they are newly added to recipes for curing that previously did not involve the addition of sugar substances. The kit, the curing salt composition and/or the sugar substance component of the kit preferably do not contain any other saccharides in particular no known sugar substances which are otherwise optionally used for curing, but especially no glucose, no fructose and/or no sucrose as the additional component in addition to the sucrose isomer composition according to the invention. The sugar substance component preferably consists exclusively of the sucrose isomer composition according to the invention which is to be characterized in greater detail below.

According to another aspect of the invention, the sugar substance component according to the invention is used together with essentially known sugar substance components, especially together with glucose and/or fructose.

The sugar substance component according to the invention is characterized according to this invention in that it contains at least one sucrose isomer, selected from trehalulose and isomaltulose. Isomaltulose or trehalulose is preferably used as the sugar substance component or more preferably mixtures thereof.

The sugar substance component preferably contains, each based on the dry solids weight, trehalulose in an amount of at least 10% by weight or more, more preferably at least 15% by weight or more, more preferably at least 20% by weight or more, more preferably at least 25% by weight or more, more preferably at least 30% by weight or more, more preferably at least 35% by weight or more, more preferably at least 40% by weight or more, more preferably at least 45% by weight or more, more preferably at least 50% by weight or more, more preferably at least 55% by weight or more, more preferably at least 60% by weight or more, more preferably at least 65% by weight or more, more preferably at least 70% by weight or more, more preferably at least 75% by weight or more, more preferably at least 80% by weight or more, more preferably at least 85% by weight or more, more preferably at least 90% by weight or more and more preferably at least 95% by weight or more.

In another preferred variant the sugar substance component contains, each based on dry solids weight, isomaltulose in an amount of at least 10% by weight or more, more preferably at least 15% by weight or more, more preferably at least 20% by weight or more, more preferably at least 25% by weight or more, more preferably at least 30% by weight or more, more preferably at least 35% by weight or more, more preferably at least 40% by weight or more, more preferably at least 45% by weight or more, more preferably at least 50% by weight or more, more preferably at least 55% by weight or more, more preferably at least 60% by weight or more, more preferably at least 65% by weight or more, more preferably at least 70% by weight or more, more preferably at least 75% by weight or more, more preferably at least 80% by weight or more, more preferably at least 85% by weight or more, more preferably at least 90% by weight or more and more preferably at least 95% by weight or more.

In an alternative embodiment, the sugar substance component is an isomaltulose syrup composition which contains, each based on the dry solids weight, 70 to 90, preferably 80 to 85% by weight isomaltulose, 5 to 15, preferably 7 to 12% by weight trehalulose and optionally 0 to approx. 8% by weight remaining saccharides, in particular selected from fructose, glucose, sucrose, isomaltose and optionally oligomers (DP≥3). In a preferred embodiment the isomaltulose syrup can be prepared as described in EP 0 625 578 A1, namely by isomerization of sucrose on preferably immobilized cells of the strain Protaminobacter rubrum. Variants of the isomaltulose syrup have compositions such as those described in EP 0 625 578 A1, especially in examples 1B, 1C, 2 and 3. A variant of the isomaltulose syrup contains approx. 82.5% by weight isomaltulose, approx. 9.5% by weight trehalulose, approx. 2.5% by weight fructose, approx. 2.0% by weight glucose, approx. 1.0% by weight sucrose, approx. 1.5% by weight isomaltose and approx. 1.0% by weight oligomers with DP≥3.

In another alternative embodiment, the sugar substance component is a trehalulose syrup composition containing, each based on dry solids weight, 70 to 85 preferably 77 to 83% by weight trehalulose, 10 to 25 preferably 15 to 20% by weight isomaltulose and optionally 0 to 3% by weight residual saccharides, in particular selected from fructose, glucose, sucrose, isomaltose, isomelezitose and oligomers (DP≥3). A trehalulose syrup can preferably be prepared according to the methods described in EP 0 625 578 A1, namely by isomerization of sucrose preferably on immobilized cells of the strain Protaminobacter rubrum. A variant of the trehalulose syrup as the composition defined in example 7 of EP 0 625 578 A1, containing approx. 80.5% by weight trehalulose, approx. 17.1% by weight isomaltulose, approx. 0.4% by weight fructose, approx. 0.4% by weight glucose, approx. 0.6% by weight sucrose, approx. 0.2% by weight isomaltose and a total of approx. 1.0% by weight isomelezitose and oligomers (DP≥3). An alternative variant according to example 7 contains approx. 85.7% by weight trehalulose, approx. 12.5% by weight isomaltulose, approx. 0.2% by weight fructose, approx. 0.2% by weight glucose, approx. 1.0% by weight sucrose, approx. 0.2% by weight isomaltose and approx. 0.2% by weight oligomers (DP≥3).

In another embodiment the sugar substance compound is a trehalulose composition containing, each based on the dry solids weight, 60 to 70 preferably 65% by weight trehalulose, 5 to 15 preferably 9 to 10% by weight isomaltulose, 20 to 30 preferably 25% by weight sucrose and optionally 0 to 3% by weight residual saccharides, in particular fructose, glucose, isomaltose and oligomers (DP>3). A trehalulose syrup can preferably be prepared according to the method described in WO 2009/095171 A1.

In another alternative embodiment, the sugar substance component is a technical-grade syrup or molasses, which is obtained in the production of isomaltulose and trehalulose in particular and can be diverted from the production process. In a preferred embodiment, it contains 25% to 40% by weight isomaltulose, 20% to 35% by weight trehalulose, 25% to 40% by weight sucrose and 0% to 15% by weight residual saccharides, in particular selected from fructose, glucose, isomaltose and oligosaccharides (DP≥3). In a preferred specific embodiment, this syrup contains 27% to 37% by weight isomaltulose, 23% to 33% by weight trehalulose, 27% to 37% by weight sucrose and up to max. 10% by weight residual saccharides, in particular fructose, glucose, isomaltose and oligosaccharides (DP≥3). In an especially preferred embodiment, this composition is a syrup which contains acidic byproducts, i.e., unbuffered acids, in particular sugar acids because of the technical process management and which has a pH of 5 or less, especially from 4 to 5, preferably from 4.5 to 5.0. In an alternative embodiment, the composition has a pH of 5 or more, preferably from 5 to 6, preferably after buffering or alkalizing the acids. This technical grade syrup is also suitable for forming the sugar component of the kit as well as an acid-forming curing additive component in addition.

It is self-evident that the invention relates not only to those sucrose isomer compositions which are obtained technically expediently as the reaction product of isomerization reactions. Instead the invention also comprises mixtures and recipes having corresponding compositions which are obtained in particular by combining the individual components or by increasing or decreasing individual components or multiple components from other compositions or mixtures. Thus the invention also comprises those sucrose isomer compositions which can be produced by mixing isomaltulose and trehalulose and optionally additional saccharides such as glucose and optionally fructose. In special variants, the subject matter of the invention is also sucrose isomer compositions which are free of a certain sucrose isomer. The sucrose isomer composition, for example, is free of isomaltulose; alternatively, the sucrose isomer composition is free of trehalulose.

In general the sucrose isomer compositions according to the invention that can be used as the sugar component of the curing kit must themselves have an antioxidant and/or reducing effect. In a preferred embodiment of the kit the sucrose isomer compositions form the sugar substance component as well as a curing additive component that has an antioxidant effect.

The inventors have surprisingly discovered that the sucrose isomer compositions characterized above when used as the sugar substance component in curing foods, in particular meat but also fish as well as products containing meat or fish such as sausage, raw fish preparation and the like in combination with nitrite curing salt, have such a positive influence on the curing process that in a first aspect, the amount of nitrite curing salt to be used, especially the amount of nitrite salt to be used per amount by weight of the foodstuff to be cured can be definitely reduced, such that the desired curing effects and other effects are largely or completely preserved. It is thus found that when using the sugar substance component according to the invention, the residual nitrite content after 72 or 120 hours of aging time of the cured food is reached significantly below the required limit value of 50 mg/kg nitrite (based on sodium nitrite).

Furthermore, the inventors have surprisingly discovered that in a second aspect a significantly better reddening of the food can be achieved preferably with a lower residual nitrite content at the same time through the use of the sugar substance component according to the invention in comparison with the reference substance glucose in similar recipes. Surprisingly an even better curing result can also be achieved when reducing the amount of the sugar substance component used than with a standard recipe in which a known sugar substance component such as glucose is used.

As the third aspect it is possible to eliminate the use of additional known antioxidant curing additive components, in particular ascorbic acid or ascorbate, largely and preferably completely when using the sugar substance component according to the invention in curing. At least the present invention with the sugar substance component that can be used according to the invention makes available means with which the use of additional antioxidant curing additive components can be reduced. The objects of the present invention thus also include a kit for curing and a curing composition having a corresponding composition which is free of additional antioxidant curing additive components such as ascorbic acid or the salts thereof.

The invention is additionally based on the finding that as the fourth aspect the sugar substance component according to the invention at least forms a so-called "curing system" with an acid-forming curing additive component which is preferably provided in addition, such that this curing system supports the curing process much more efficiently and accelerates it in comparison with the known curing systems such as glucose and ascorbic acid. Thus the subject of the invention is also a kit or a corresponding curing salt composition, in which nitrite salt, especially sodium nitrite, is present in the nitrite curing salt component in a reduced amount of max. 0.6% by weight preferably 0.1 to 0.6% by weight and especially preferably up to 0.5% by weight, more preferably up to 0.4% by weight, more preferably up to 0.3% by weight. In the kit or a curing salt composition according to the invention, the nitrite salt, in particular sodium nitrite, is preferably present in an amount of up to max. 150 mg, preferably max. 100 mg, especially preferably max. 50 mg, more preferably in an amount always less than 50 mg, each based on 1 kg of the foodstuff to be cured.

In addition the inventors have surprisingly discovered that in a fifth aspect the sugar substance component according to the invention in combination with one or more novel acid-forming curing additive components in particular lactobionic acid and/or lactobionic acid-delta-lactone exhibits the surprising technical effects described above to an even greater extent. The subject of the invention is thus also a kit or a corresponding curing salt composition which has at least one acid-forming curing additive component. This is preferably selected from the group of acid-forming substances consisting of: ascorbic acid and its salts, glucono-delta-lactone, lactobionic acid and its salts, lactobionic acid-delta-lactone as well as mixture thereof. The acid-forming curing additive component is especially preferably lactobionic acid. In another preferred variant the acid-forming curing additive component is lactobionic acid-delta-lactone. In another preferred variant the acid-forming curing additive component is a mixture of ascorbic acid or salts thereof with lactobionic acid or salts thereof, alternatively or preferably additionally in combination with lactobionic acid-delta-lactone.

In another embodiment the kit according to the invention and/or the corresponding curing salt composition additionally contains at least one, preferably additional antioxidant curing additive components which are preferably selected from the group of antioxidants consisting of: secondary plant substances, spices and spice extracts with an antioxidant effect as well as mixtures thereof. In one variant the antioxidant curing additive component is formed by the acid-forming curing additive component of the kit as characterized above. In another preferred variant the antioxidant curing additive component is formed by the sugar substance component of the kit as characterized above, this component preferably also being the acid-forming curing additive component.

The acid-forming curing additive component in the kit or the corresponding curing salt composition is preferably present in an amount of 0.1 to 9 kg preferably 0.1 to 5 g, especially preferably from 0.1 to 1.5 g (based on the dry solids weight of the curing additive component), or in the case of lactobionic acid and/or lactobionate and also in the case of lactobionic acid-delta-lactone, preferably in an amount of 0.1 to 3 g, especially preferably from 0.1 to 1.5 g (based on the dry solids weight), each based on 1 kg of the foodstuff to be cured.

Another aspect of the invention provides a curing system in which an essentially known sugar substance component, especially glucose, together with one of the novel acid-forming curing additive components defined more specifically above, in particular lactobionic acid and/or lactobionate and/or lactobionic acid-delta-lactone and/or mixtures thereof is prepared. In conjunction with this aspect, the present inventors surprisingly discovered that these novel acid-forming curing additive components support and synergistically improve the effect of known curing additives such as sugar substances, in particular glucose and preferably also the effect of known antioxidant curing additives such as preferably ascorbic acid or ascorbate. The invention thus accordingly also provides a kit for use for curing foods and/or a curing additive composition which contains or preferably consists of at least glucose as the sugar substance component and optionally also ascorbic acid and/or ascorbate as the antioxidant component together with a novel acid-forming curing additive component according to the invention, selected from lactobionic acid, lactobionate, lactobionic acid-delta-lactone and mixtures thereof.

Accordingly ascorbic acid and/or ascorbate together with lactobionic acid and/or lactobionate is each present as the acid-forming curing additive component in the kit according to the invention or the corresponding curing salt composition, each present in an amount of 0.1 to 3 g, especially preferably from 0.1 to 1.5 g (based on the dry solids weight), each based on 1 kg of the foodstuff to be cured.

The subject of the invention is also a method for producing cured foods, which is performed in particular by using the kit according to the invention characterized above or the corresponding curing salt composition. To do so, in a preferred first step, the foodstuff to be cured is combined with the nitrite curing salt component. Nitrite is preferably added to the food in an amount of max. 150 mg, preferably max. 100 mg, especially preferably max. 50 mg, more preferably always less than 50 g per 1 kg of the foodstuff to be cured. In the step which preferably follows or alternatively is preferably performed at the same time, preferably the second step, the food is brought in contact with the sugar substance component according to the invention. This yields a cured food product.

The sugar substance component according to the invention is preferably added to the food in an amount of 0.3 to 15 g, preferably from 0.5 to 9 g, especially preferably from 1 to 5 g, based on the dry solids weight of the sugar substance component and each based on 1 kg of the foodstuff to be cured.

In a special embodiment of the method, the food is preferably then brought in contact or alternatively preferably essentially simultaneously in contact with at least one preferably additional acid-forming curing additive component, namely to lower the pH in the food and to influence the curing process in a positive sense.

In another or alternative embodiment of the method, the food is brought in contact with a preferably additional curing additive component having an antioxidant effect in another step which is preferably performed subsequently or alternatively preferably essentially simultaneously. The antioxidant curing additive component has a reducing effect and support the curing process.

In a preferred variant no additional sugar substance component, in particular no glucose, no fructose and no sucrose is added to the food in preparation. In another variant, no additional acid-forming and/or antioxidant curing additive is added to the food. The sugar substance according to the invention is preferably the only curing additive added to the food in curing or for the purpose of curing.

The food combined with the components characterized above is preferably aged in a known way by storage in another step preferably performed immediately thereafter (left to age) so that a cured foodstuff is obtained. The aging time amounts to at least 24, preferably at least 72 alternatively preferably at least 120 hours.

According to the invention the foodstuff is preferably selected from meat and meat-containing compositions such as sausage products and the like as well as fish and fish-containing compositions as well as raw fish preparations and the like. The subject of the invention is also a cured food product that can be produced by performing the method according to the invention as described above, in particular a cured meat or fish product, especially preferably cured meat or sausage product.

According to the invention the sucrose isomer composition characterized above is used as a curing aid for reducing the residual nitrite content in cured food products. In another embodiment, the sucrose isomer composition characterized above is used as a curing additive component to improve the reddening effect of nitrite curing salt. In another embodiment, the sucrose isomer composition characterized above is used as a sugar substance component and at the same time as an antioxidant curing additive to reduce the amount of other antioxidant curing additives such as ascorbic acid and ascorbate or to avoid the use of such additional antioxidant curing additives in the cured food product.

In another embodiment the sucrose isomer composition is used as a sugar substance component and at the same time as an acid-forming curing additive to support the curing effect and/or to reduce or avoid additional acid-forming curing additives in the cured food product.

The invention will now be characterized in greater detail by the exemplary embodiments described below and the advantages claimed will be described although these should not be understood as restricting the scope of the invention in any way.

EXAMPLES

Tests of the Residual Nitrite Content and the Reddening Quality of Cured Raw Sausage According to the Invention To investigate the effect of the sugar substance components according to the invention and the curing additive components according to the invention, raw sausage samples are produced in an essentially known manner. In particular beef and pork as well as bacon are used in variable amounts.

In a first step lean meat and fatty material (bacon) are ground finely in portions of approx. one kilogram at temperatures below 4° C., preferably in a slightly frozen state with the help of a meat grinder using 2 mm disks in an essentially known manner to obtain a meat sausage mix.

Sausage meat portions of 200 g each cooled to approx. 2° C. are transferred to a mixer (Grindomix™ GM-200 (Retsch Co.)) and mixed with the curing salt component and the curing additives: sugar substance component, additional optionally acid-forming curing additive component and/or such a component having an antioxidant effect. The composition is first mixed for about 1 minute at 6000 rpm and then for about 2 minutes at 3500 rpm, forming a homogeneous minced mixture. Next the mixture is kneaded for approx. 3 minutes and then packaged in a sample container, a shell of parchment, and stored at room temperature (18 to 22° C.) under normal conditions for approx. 1 day (17 to 24 hours) up to a total of 5 days (120 hours) (aging).

At certain intervals, samples are taken to evaluate the residual nitrite content and the degree of reddening.

To determine the residual nitrite content, according to BVL L07.00-12 (Technical Rules for Detection of Food Additives; official collection pursuant to § 35 of the German LMBG; the essentially known procedure is followed for determination of the nitrite and nitrate content of meat products). Specifically exactly 10.0 g of a sample is weighed into an Erlenmeyer flask and heated with 100 mL hot water for 30 minutes in a boiling water bath (100° C.) while agitating.

After cooling, by adding 2 mL Garrez solution I and II (Garrez solution I: potassium hexacyanoferrate (II); Garrez solution II: zinc sulfate.$7H_2O$ in water, 300 g/liter) precipitation of protein is initiated. To do so the sample is shaken for 30 minutes and then left to stand at room temperature until a clear supernatant has formed. To separate the protein fraction the solution is transferred to a 200 mL graduated flask and topped off with 200 mL water, mixed again and then filtered.

To detect the nitrate, the resulting filtrate is mixed with 3 mL of a reagent of sulfanilamide and N-(1-naphthyl)ethylene diammonium dichloride solution (1:1), whereupon a colored complex is formed. After about 30 minutes of resting at room temperature, the extinction of the solution at 540 nm is determined and compared with that of a standard solution. The concentration of nitrite (represented as $NaNO_2$) is determined from the measured values in relation to the comparative values of the standard solution.

To determine the degree of reddening, a color measurement (red value a*) is performed according to CIE by a known method. The sausage color is measured with a spectrophotometer of the CM-2002 type (Minolta Camera Co. Ltd., Japan) with the type of light DE65/10°.

To represent the results the residual nitrite content is given in mg/kg sample. The reddening is given as an a* red value (dimensionless value). The individual sample compositions are listed in the following tables showing the amounts of nitrite, sugar substance component, curing aid component.

In the following examples, a composition containing the following components is used as "isomaltulose syrup":
Isomaltulose: 82.5%
Trehalulose: 9.5%
Fructose: 2.5%
Glucose: 2.0%
Sucrose: 1.0%
Isomaltose: 1.5%
Oligomers: 1.0%
each in % by weight calculated on the basis of dry solids weight The following composition is used under the heading "trehalulose syrup":
Trehalulose: 80.5%
Isomaltulose: 17.1%
Fructose: 0.4%
Glucose: 0.4%
Sucrose: 0.6%
Isomaltose: 0.2%
Isomelezitose and oligomers: 1.0%
each in % by weight calculated on the basis of dry solids weight The following composition is used under the heading "bulk tank syrup":
Isomaltulose: 32±5%
Trehalulose: 28±5%
Fructose, glucose and sucrose: 32±5%
Isomaltose and oligomers: max. 10%
each in % by weight calculated on the basis of dry solids weight The brand name "Syrup B60" is understood to refer to a "bulk tank syrup" composition under having a pH of 4.5 to 5.0 because of the presence of unbuffered acids.

Examples 1 Through 6

A raw meat mixture containing 20% beef, 50% lean pork and 30% fat was processed with the curing components listed in Table 1A to form a raw sausage meat mixture by an essentially known method. (Example 1 is the pure raw meat mixture without the addition of nitrite curing salt and curing additives. Neither a residual nitrite content nor a red value of the reddening could be determined in example 1. The results for this example are not shown in the following tables.) Example (Ex. 2) is the comparative experiment using an essentially known curing composition.

Tables 1B and 1C each show the residual nitrite content and the degree of reddening, each determined after an aging time of 24 hours or 74 hours, respectively.

TABLE 1A

| Ingredient (not including spice) | Ex. 2 | Ex. 3 | Ex. 4 | Ex. 5 | Ex. 6 |
|---|---|---|---|---|---|
| | (amount per 1 kg raw meat mixture) | | | | |
| Glucose | 5.0 g | | | | |
| Isomaltulose | | 5.0 g | | | |
| Trehalulose | | | 5.0 g | | |
| Isomaltulose syrup | | | | 5.0 g (DS) | |
| Trehalulose syrup | | | | | 5.0 g (DS) |
| Ascorbic acid | 0.3 g | 0.3 g | 0.3 g | 0.3 g | 0.3 g |
| Sodium chloride | 25.0 g | 25.0 g | 25.0 g | 25.0 g | 25.0 g |
| Sodium nitrite | 100 mg | 100 mg | 100 mg | 100 mg | 100 mg |

DS = dry solids

TABLE 1B

| Aging time h | Ex. 2 Glucose | Ex. 3 Isomaltulose | Ex. 4 Trehalulose | Ex. 5 Isomaltulose syrup | Ex. 6 Trehalulose syrup |
|---|---|---|---|---|---|
| | | | $NO_2^-$ mg/kg | | |
| 0 | 100 | 100 | 100 | 100 | 100 |
| 24 | 90 | 80 | 75 | 71 | 70 |
| 74 | 70 | 50 | 40 | 30 | 30 |

TABLE 1C

| Aging time h | Ex. 2 Glucose | Ex. 3 Trehalulose | Ex. 4 Isomaltulose | Ex. 5 Isomaltulose syrup | Ex. 6 Trehalulose syrup |
|---|---|---|---|---|---|
| | | | a* (red value) | | |
| 24 | 3.4 | 4.48 | 3.7 | 5.6 | 5.5 |
| 74 | 6.1 | 8.9 | 8.7 | 10.1 | 10.1 |

Examples 7 Through 13

A raw meat mixture was prepared from 40% beef, 40% lean pork and 20% bacon. This was used to prepare a raw sausage mixture using the curing substances mentioned in Table 2A.

Table 2B shows the residual nitrite content and the degree of reddening each after an aging time of 24 hours and 120 hours, respectively.

TABLE 2A

| Ingredient (not including spice) | Ex. 7 | Ex. 8 | Ex. 9 | Ex. 10 |
|---|---|---|---|---|
| | (amount per 1 kg raw meat mixture) | | | |
| Glucose | 5.0 g | | | |
| Isomaltulose | | 5.0 g | | |
| Trehalulose | | | 5.0 g | |
| Isomaltulose syrup | | | | 5.0 g (DS) |
| Trehalulose syrup | | | | |
| Syrup (bulk tank) | | | | |
| Syrup B60 | | | | |
| Ascorbic acid | 0.3 g | 0.3 g | 0.3 g | 0.3 g |
| Sodium chloride | 25.0 g | 25.0 g | 25.0 g | 25.0 g |
| Sodium nitrite | 150 mg | 150 mg | 150 mg | 150 mg |

| Ingredient (not including spice) | Ex. 11 | Ex. 12 | Ex. 13 |
|---|---|---|---|
| | (amount per 1 kg raw meat mixture) | | |
| Glucose | | | |
| Isomaltulose | | | |
| Trehalulose | | | |
| Isomaltulose syrup | | | |
| Trehalulose syrup | 5.0 g (DS) | | |
| Syrup (bulk tank) | | 5.0 g (DS) | |
| Syrup B60 | | | 5.0 g (DS) |
| Ascorbic acid | 0.3 g | 0.3 g | 0.3 g |
| Sodium chloride | 25.0 g | 25.0 g | 25.0 g |
| Sodium nitrite | 150 mg | 150 mg | 150 mg |

DS = dry solids

TABLE 2B

| | | Red value a* | | $NO_2^-$ mg/kg | |
|---|---|---|---|---|---|
| | | 24 h | 120 h | 24 h | 120 h |
| Ex. 7 | Glucose | 11.1 | 12.04 | 120 | 70 |
| Ex. 8 | Isomaltulose | 11.71 | 13.97 | 100 | 20 |
| Ex. 9 | Trehalulose | 12.95 | 14.48 | 80 | 20 |
| Ex. 10 | Isomaltulose syrup | 13.3 | 14.22 | 98 | 20 |
| Ex. 11 | Trehalulose syrup | 13.1 | 13.82 | 100 | 20 |
| Ex. 12 | Bulk tank syrup | 13.01 | 15.42 | 100 | 10 |
| Ex. 13 | Syrup B60 | 12.5 | 13.87 | 120 | 20 |

Examples 14 Through 21

A raw meat mixture comprised of 45% beef, 35% lean pork and 20% bacon was prepared and processed to a raw sausage mixture using the curing aids listed in Table 3A.

Table 3B shows the degree of reddening and the residual nitrite content after an aging time of 17 and 72 hours, respectively.

TABLE 3A

| Ingredient (not including spice) | Ex. 14 | Ex. 15 | Ex. 16 | Ex. 17 |
|---|---|---|---|---|
| | (amount per 1 kg raw meat mixture) | | | |
| Glucose | 5.0 g | | | |
| Bulk tank syrup (B.T) | | 5.0 g (DS) | | |
| Bulk tank syrup (B.T) | | | 5.0 g (DS) | |
| Bulk tank syrup (B.T) | | | | 5.0 g (DS) |
| Bulk tank syrup (B.T) | | | | |
| Bulk tank syrup (B.T) | | | | |
| Syrup B60 | | | | |
| Glucose | | | | |
| Ascorbic acid (AscA) | 0.3 g | 0.3 g | 0.3 g | |
| Lactobionic acid (LacA) | | | 0.3 g (DS) | 0.3 g (DS) |
| Lactobionic acid-delta-lactone (LacdL) | | | | |
| Gluconic acid-delta-lactone (GdL) | | | | |

TABLE 3A-continued

| | | | | |
|---|---|---|---|---|
| Sodium chloride | 25.0 g | 25.0 g | 25.0 g | 25.0 g |
| Sodium nitrite | 150 mg | 150 mg | 150 mg | 150 mg |

Examples 22 to 27

A raw meat mixture of 50% beef, 30% lean port and 20% bacon was prepared and processed with the curing substances listed in Table 4A to form a raw sausage mixture.

Table 4B shows the degree of reddening and the residual nitrite content after an aging time of 17 hours and 72 hours, respectively.

TABLE 4A

| Ingredient (not including spice) | Ex. 22 | Ex. 23 | Ex. 24 | Ex. 25 | Ex. 26 | Ex. 27 |
|---|---|---|---|---|---|---|
| Glucose | 5.0 g | | | | | |
| Isomaltulose | | 2.5 g | | | | |
| Isomaltulose syrup | | | 2.5 g (DS) | | | |
| Trehalulose syrup | | | | 2.5 g (DS) | | |
| Bulk tank syrup | | | | | 2.5 g (DS) | |
| Syrup B60 | | | | | | 2.5 g (DS) |
| Ascorbic acid | 0.3 g | 0.3 g | 0.3 g | 0.3 g | 0.3 g | 0.3 g |
| Sodium chloride | 25.0 g | 25.0 g | 25.0 g | 25.0 g | 25.0 g | 25.0 g |
| Sodium nitrite | 150 mg | 150 mg | 150 mg | 150 mg | 150 mg | 150 mg |

DS = dry solids

TABLE 3A-continued

| Ingredient (not including spice) | Ex. 18 | Ex. 19 | Ex. 20 | Ex. 21 |
|---|---|---|---|---|
| | (amount per 1 kg raw meat mixture) | | | |
| Glucose | | | | |
| Bulk tank syrup (B.T) | | | | |
| Bulk tank syrup (B.T) | | | | |
| Bulk tank syrup (B.T) | | | | |
| Bulk tank syrup (B.T) | 5.0 g (DS) | | | |
| Bulk tank syrup (B.T) | | 5.0 g (DS) | | |
| Syrup B60 | | | 5.0 g (DS) | |
| Glucose | | | | 5.0 g (DS) |
| Ascorbic acid (AscA) | | | | |
| Lactobionic acid (LacA) | | | | 0.3 g (DS) |
| Lactobionic acid-delta-lactone (LacdL) | 5.0 g | | | |
| Gluconic acid-delta-lactone (GdL) | | 5.0 g | | |
| Sodium chloride | 25.0 g | 25.0 g | 25.0 g | 25.0 g |
| Sodium nitrite | 150 mg | 150 mg | 150 mg | 150 mg |

DS = dry solids

TABLE 3B

| | Curing system | Red value a* | | NO$_2^-$ mg/kg | |
|---|---|---|---|---|---|
| | | 17 h | 72 h | 17 h | 72 h |
| Ex. 14 | Glucose + AscA | 11.75 | 12.96 | 80 | 120 |
| Ex. 15 | B.T + AscA | 13.67 | 14.06 | 35 | 110 |
| Ex. 16 | B.T + AscA + LacA | 14.66 | 14.5 | 35 | 100 |
| Ex. 17 | B.T + LacA | 14.83 | 15.57 | 30 | 100 |
| Ex. 18 | B.T + LacdL | 14.58 | 15.1 | 30 | 100 |
| Ex. 19 | B.T + GdL | 15.59 | 15.89 | 20 | 90 |
| Ex. 20 | Syrup B60 | 15.26 | 16.68 | 15 | 90 |
| Ex. 21 | Glucose + LacA | 13.83 | 15.11 | 35 | 110 |

TABLE 4B

| | | a* red value | | NO$_2^-$ mg/kg | |
|---|---|---|---|---|---|
| | | 17 h | 72 h | 17 h | 72 h |
| Ex. 22 | Glucose | 10.67 | 13.64 | 110 | 70 |
| Ex. 23 | Isomaltulose | 11.12 | 13.65 | 100 | 65 |
| Ex. 24 | Isomaltulose syrup | 13.88 | 15.02 | 80 | 40 |
| Ex. 25 | Trehalulose syrup | 13.69 | 14.92 | 80 | 40 |
| Ex. 26 | Bulk tank syrup | 11.79 | 15.05 | 90 | 30 |
| Ex. 27 | Syrup B60 | 11.41 | 13.92 | 100 | 50 |

Examples 28 to 32

A raw meat mixture of 50% beef, 30% lean pork and 20% bacon was prepared and processed to a raw sausage mixture using the curing substances listed in Table 5A.

Table 5B shows the degree of reddening and the residual nitrite content after an aging time of 17 and 72 hours, respectively.

TABLE 5A

| Ingredient (not including spice) | Ex. 28 | Ex. 29 | Ex. 30 | Ex. 31 |
|---|---|---|---|---|
| | (amount per 1 kg raw meat mixture) | | | |
| Isomaltulose | 2.5 g | | | |
| Isomaltulose | | 2.5 g | | |
| Isomaltulose | | | 2.5 g | |
| Isomaltulose | | | | 2.5 g |
| GdL | 3.0 g | | | |
| Lactobionic acid | | 0.3 g | | |
| Lactobionic acid lactone | | | | |
| Iron gluconate | | | | |
| Sodium chloride | 25.0 g | 25.0 g | 25.0 g | 25.0 g |
| Sodium nitrite | 150 mg | 150 mg | 150 mg | 150 mg |

TABLE 5B

| | | a* red value | | NO$_2^-$ mg/kg | |
| --- | --- | --- | --- | --- | --- |
| | | 17 h | 72 h | 17 h | 72 h |
| Ex. 28 | GdL | 13.08 | 13.86 | 85 | 45 |
| Ex. 29 | Lactobionic acid | 13.97 | 15.12 | 60 | 20 |
| Ex. 30 | Lactobionic acid lactone | 12.99 | 13.8 | 90 | 50 |
| Ex. 31 | GdL + iron gluconate | 13.56 | 13.93 | 70 | 40 |

Comparison

| Ex. 22 | Glucose + AscA | 10.67 | 13.64 | 110 | 70 |
| --- | --- | --- | --- | --- | --- |

Examples 32 to 42

A raw meat mixture of 40% beef, 40% lean pork and 20% bacon was prepared and processed to a raw sausage mixture using the curing substances listed in Table 6A.

Table 6B shows the degree of reddening and the residual nitrite content after an aging time of 24 and 72 hours, respectively.

TABLE 6A

| Ingredient (not including spice) | Ex. 32 | Ex. 33 | Ex. 34 | Ex. 35 | Ex. 36 |
| --- | --- | --- | --- | --- | --- |
| | | (amount per 1 kg raw meat mixture) | | | |
| Glucose | 5.0 g | | | | |
| Isomaltulose | | 5.0 g | 2.5 g | 2.5 g | |
| Bulk tank syrup | | | | | 5.0 g (DS) |
| Syrup B60 | | | | | |
| Ascorbic acid | 0.3 g | 0.3 g | 0.3 g | 0.15 g | 0.3 g |
| Sodium chloride | 25.0 g | 25.0 g | 25.0 g | 25.0 g | 25.0 g |
| Sodium nitrite | 150 mg | 150 mg | 150 mg | 150 mg | 150 mg |
| Ingredient (not including spice) | Ex. 37 | Ex. 38 | Ex. 39 | Ex. 40 | Ex. 41 | Ex. 42 |
| | | (amount per 1 kg raw meat mixture) | | | | |
| Glucose | | | | | | |
| Isomaltulose | | | | | | |
| Bulk tank syrup | 2.5 g (DS) | 2.5 g (DS) | | | | |
| Syrup B60 | | | 5.0 g (DS) | 2.5 g (DS) | 2.5 g (DS) | 2.5 g (DS) |
| Ascorbic acid | 0.3 g | 0.15 g | 0.3 g | 0.3 g | 0.15 g | |
| Sodium chloride | 25.0 g | 25.0 g | 25.0 g | 25.0 g | 25.0 g | 25.0 g |
| Sodium nitrite | 150 mg | 150 mg | 150 mg | 150 mg | 150 mg | 150 mg |

DS = dry solids

TABLE 6B

| | a* red value | | NO$_2^-$ mg/kg | |
| --- | --- | --- | --- | --- |
| | 24 h | 72 h | 24 h | 72 h |
| Ex. 32 | 12.93 | 15.38 | 110 | 75 |
| Ex. 33 | 17.26 | 18.11 | 70 | 40 |
| Ex. 34 | 16.75 | 17.68 | 75 | 50 |
| Ex. 35 | 15.33 | 16.58 | 90 | 55 |
| Ex. 36 | 17.01 | 19.18 | 72 | 20 |
| Ex. 37 | 16.08 | 18.07 | 80 | 40 |
| Ex. 38 | 16.4 | 17.59 | 78 | 50 |
| Ex. 39 | 17.66 | 18.45 | 65 | 25 |
| Ex. 40 | 16.95 | 17.59 | 75 | 40 |
| Ex. 41 | 15.89 | 16.2 | 85 | 55 |
| Ex. 42 | 16.18 | 17.09 | 80 | 50 |

The sucrose isomer compositions according to the invention as well as the sucrose isomers as pure substances (isomaltulose, crystalline or trehalulose, freeze dried) permit a significantly better reddening in comparison with the reference substance glucose and have a lower residual nitrite content as a function of the aging time. It is also found that even with a reduction in the quantity of sugar substance components used, nitrite curing salt components and other curing additive components, a better curing result can be achieved than with a standard recipe using glucose. The use of ascorbic acid/ascorbate may be reduced or optionally stopped completely in the presence of the sugar substance components according to the invention. The residual nitrite content after 72 hours or 120 hours of aging time for example is clearly below the limit of 50 mL/kg [sic; mg/kg] nitrate which is required for biological meat products by law. In addition it is found that the sugar substance components according to the invention are especially effective in particular in combination with lactobionic acid and lactobionic acid-delta-lactone, the novel curing additives according to the invention. The latter also form an improved curing system in combination with the known sugar substance components such as glucose.

The invention claimed is:

1. A composition for curing a food product, the composition comprising:
   0.1 to 0.6% by weight of a nitrite curing salt component (NPS); and
   a sugar substance component, which is a sucrose isomer composition comprising at least 50% (w/w) of the sucrose isomers isomaltulose and trehalulose,
   wherein the composition generates a cured food with a lower residual nitrite content and improved reddening relative to a food product cured with only glucose as a sugar component.

2. The composition for curing a food product according to claim 1, wherein the sugar substance component is present in the composition in an amount of 1.9 to 27% by weight.

3. The composition for curing a food product according to claim 1, wherein the sugar substance component is a trehalulose syrup composition containing 70% to 85% by weight trehalulose, 10% to 15% by weight isomaltulose and 0 to 3% by weight residual saccharides based on dry solids weight.

4. The composition for curing a food product according to claim 1, wherein the sugar substance component is an isomaltulose syrup composition containing 70% to 90% by weight isomaltulose, 5 to 15% by weight trehalulose and 0 to 3% by weight residual saccharides based on dry solids weight.

5. The composition for curing a food product according to claim 1, further comprising:
an acid-forming curing additive component selected from the group consisting of ascorbic acid and salts thereof, glucono-delta-lactone, lactobionic acid and salts thereof, lactobionic acid-delta-lactone and mixtures thereof.

6. The composition for curing a food product according to claim 5, wherein the acid-forming curing additive component is present in the composition in an amount of 0.3 to 25% by weight.

7. The composition for curing a food product according to claim 5, wherein lactobionic acid and/or lactobionate is present in the composition in an amount of 0.3 to 5% by weight and as the acid-forming curing additive component.

8. The composition for curing a food product according to claim 5, wherein lactobionic acid and/or lactobionate together with ascorbic acid and/or ascorbate is present in the composition each in an amount of 0.3 to 5% by weight is present as the acid-forming curing additive component.

9. The composition for curing a food product according to claim 5, wherein the sugar substance component of the composition also forms the acid-forming curing additive component and the sugar substance component/acid-forming component is a sucrose isomer composition containing unbuffered acids with a pH of 4 to 5.

10. The composition for curing a food product according to claim 5, further comprising an antioxidant curing additive component.

11. The composition for curing a food product according to claim 10, wherein the curing additive component having an antioxidant effect is selected from a group of antioxidants consisting of secondary plant substances, spices and spice extracts and mixtures thereof.

12. The composition for curing a food product according to claim 10, wherein the acid-forming curing additive component of the composition is also the curing additive component that has the antioxidant effect.

13. The composition for curing a food product according to claim 11, wherein the acid-forming curing additive component of the composition is also the curing additive component that has the antioxidant effect.

14. The composition for curing a food product according to claim 10, wherein the sugar substance component of the composition is also the curing additive component that has the antioxidant effect.

15. The composition for curing a food product according to claim 11, wherein the sugar substance component of the composition is also the curing additive component that has the antioxidant effect.

16. The composition for curing a food product according to claim 11, wherein the sugar substance component of the composition is both the acid-forming curing additive component and the antioxidant curing additive component.

17. The composition for curing a food product according to claim 12, wherein the sugar substance component of the composition is both the acid-forming curing additive component and the antioxidant curing additive component.

18. The composition for curing a food product according to claim 1, which is free of additional sugar substitutes.

19. A method for preparing cured food product with the composition of claim 1, the method comprising:

bringing the food product to be cured into contact with the nitrite curing salt component (NPS);
bringing the food product into contact with the sugar substance component; and
generating the cured food product having a lower residual nitrite content and improved reddening relative to a food product cured with only glucose as a sugar component.

20. The method according to claim 19, further comprising bringing the food into contact with an acid-forming curing additive component.

21. The method according to claim 19, further comprising bringing the food into contact with an antioxidant curing additive component.

22. The method according to claim 19, further comprising allowing the food to age so that a cured food is obtained.

23. The method according to claim 19, wherein no additional sugar components are added to the cured food product during preparation.

24. The method according to claim 19, wherein the food product is selected from the group consisting of meat and meat-containing compositions.

25. The method according to claim 19, further comprising reducing a residual nitrite content in the cured food product with the sucrose isomer composition relative to a residual nitrite content in food cured without the sucrose isomer composition.

26. The method according to claim 19, further comprising improving the reddening effect of nitrite curing salt with the sucrose isomer composition relative to a reddening effect of nitrite curing salt in food cured without the sucrose isomer composition.

27. The method according to claim 19, further comprising reducing an amount of other antioxidant curing additives in the food product with the sucrose isomer composition as a sugar component and as an antioxidant curing additive relative to an amount of other antioxidant curing additives in food cured without the sucrose isomer composition.

28. The composition for curing a food product of claim 1, which is free of glucose, fructose and sucrose.

29. The composition for curing a food product of claim 19, where no glucose, fructose or sucrose are added to the cured food product during preparation.

30. The composition for curing a food product of claim 24, wherein the meat-containing compositions include sausage products and fish containing compositions.

31. The method according to claim 27, wherein reducing an amount of other antioxidant curing additives comprises reducing the amounts of ascorbic acid and ascorbate.

32. A method for preparing cured food product, the method comprising:
contacting a food product to be cured with a nitrite curing salt component comprising nitrite salt in an amount of 0.1 to 0.6% by weight;
contacting the food product to be cured with a sugar substance component comprising at least 50% (w/w) of isomaltulose and trehalulose; and
storing the food product at room temperature for 17 to 120 hours; and
curing the cured food product to have a lower residual nitrite content and improved reddening relative to a food cured with only glucose as a sugar component.

33. A method for preparing cured food product, the method comprising:
contacting a food product to be cured with a nitrite curing salt component comprising nitrite salt in an amount of 0.1 to 0.6% by weight;

contacting the food product to be cured with a sugar substance component comprising at least 50% (w/w) of isomaltulose and trehalulose;

contacting the food product to be cured with an additive component selected from the group consisting of glucono-delta-lactone, lactobionic acid, salts of lactobionic acid, lactobionic acid-delta-lactone, and mixtures thereof; and storing the food product at room temperature for at least 24 hours; and generating cured food with a lower residual nitrite content and improved reddening relative to a food product cured with only glucose as a sugar component without contacting the food product to be cured with ascorbic acid or ascorbate.

* * * * *